United States Patent Office.

LEVI S. FALES, OF TARRYTOWN, NEW YORK.

*Letters Patent No. 71,724, dated December 3, 1867.*

IMPROVED FERTILIZING COMPOUND.

*The Schedule referred to in these Letters Patent and making part of the same.*

TO ALL WHOM IT MAY CONCERN:

Be it known that I, LEVI S. FALES, of Tarrytown, in the county of Westchester, and State of New York, have invented a new and useful Improvement in Fertilizers; and I do hereby declare that the following is a full, clear, and exact description of the same.

The object of this invention is to provide a strong and stimulating manure, especially adapted to grass-lands, costing less and capable of more convenient employment than guano.

The invention consists in a novel combination of certain manurial and other substances, whereby the result desired is very effectually secured.

To enable others to understand the nature of my invention, I will proceed to describe its composition and mode of manufacture.

In the manufacture of my fertilizer, I take the ammoniacal water of gas-works, and, by subjecting the same to heat in a suitable boiler, expel the ammonia therefrom, and conduct the said ammonia to a vessel, of any appropriate kind, containing what is commonly termed waste acid, from petroleum-refineries, in such manner that the ammonia, by combining with the acid, may form crude sulphate of ammonia, which, after precipitation, is collected, and has added to it an equal volume of water. With one ton of this mixture are mingled twenty-five (25) pounds of charcoal, the office of which is to absorb and prevent the escape of whatever free ammonia may be evolved from the sulphate just mentioned; two hundred (200) pounds of pulverized bones, designed to supply the requisite percentage of lime and phosphorus; twenty-five (25) pounds of sulphuric acid of ordinary strength, intended to render the constituents of the bones more capable of assimilation by plants; and fifty (50) pounds of dried blood, the function of which is to provide a due proportion of nitrogenized organic matter. To the several materials thus mingled is added a sufficient quantity of so-called sea-sand, to absorb whatever liquid may remain unabsorbed by the other materials, thus bringing the fertilizer to the degree or condition of comparative dryness required in the transportation and use thereof, the said sand not only serving as an absorbent, as just set forth, and to bring the compound to the state of fineness or comminution desirable in using the same, but also adding materially to its fertilizing or manurial properties, inasmuch as this variety of sand is found to contain an appreciable amount of lime and organic matter, capable of exerting a very beneficial effect upon the soil.

It is to be understood, of course, that in making the fertilizer, as just set forth, its several constituents are thoroughly mingled or intermixed by any suitable means. Furthermore, when desired, the sulphuric acid added, as hereinbefore indicated, to partially reduce the bones, or, in other words, to partially liberate the phosphoric acid therefrom, may be dispensed with, inasmuch as the said acid, although facilitating the action of the manure when applied to the soil, does not of itself contribute to the nourishment of plants.

What I claim as my invention, and desire to secure by Letters Patent, is—

The fertilizer, composed of sea-sand, sulphate of ammonia, charcoal, bones, and dried blood, substantially as herein set forth.

LEVI S. FALES.

Witnesses:
A. LE CLERC,
CHAS. H. ASHTON.